(12) United States Patent
McFarland

(10) Patent No.: US 7,190,774 B2
(45) Date of Patent: Mar. 13, 2007

(54) USER INVOKED DIRECTED OUTDIAL METHOD AND APPARATUS

(75) Inventor: Stephen McFarland, Groton, MA (US)

(73) Assignee: Aspect Communications Corporation, San Jose, CA (US)

( * ) Notice: Subject to any disclaimer, the term of this patent is extended or adjusted under 35 U.S.C. 154(b) by 254 days.

(21) Appl. No.: 10/196,775

(22) Filed: Jul. 16, 2002

(65) Prior Publication Data

US 2003/0068029 A1    Apr. 10, 2003

Related U.S. Application Data

(63) Continuation of application No. 09/652,978, filed on Aug. 31, 2000.

(60) Provisional application No. 60/210,923, filed on Jun. 12, 2000.

(51) Int. Cl.
  *H04M 3/42* (2006.01)
  *H04M 3/00* (2006.01)
  *H04M 5/00* (2006.01)
  *H04M 11/00* (2006.01)

(52) U.S. Cl. .................. 379/202.01; 379/244; 455/406

(58) Field of Classification Search ............. 379/88.25, 379/93.14, 202.01, 88.22, 265.06, 244; 704/3; 705/10; 455/406
See application file for complete search history.

(56) References Cited

U.S. PATENT DOCUMENTS

| | | | |
|---|---|---|---|
| 4,805,209 A | 2/1989 | Baker, Jr. et al. | |
| 4,924,491 A | 5/1990 | Compton et al. | |
| 4,964,077 A | 10/1990 | Eisen et al. | |
| 5,040,208 A | 8/1991 | Jolissaint | |
| 5,155,761 A | 10/1992 | Hammond | |
| 5,181,236 A | 1/1993 | LaVallee | |
| 5,185,780 A | 2/1993 | Leggett | |
| 5,185,782 A | 2/1993 | Srinivasan | |
| 5,185,786 A | 2/1993 | Zwick | |
| 5,214,688 A | 5/1993 | Szlam et al. | |
| 5,239,617 A | 8/1993 | Gardner et al. | |
| 5,247,569 A | 9/1993 | Cave | |
| 5,283,824 A | 2/1994 | Shaw | |
| 5,289,368 A | 2/1994 | Jordan et al. | |
| 5,329,581 A * | 7/1994 | Friedes et al. ........... | 379/93.14 |
| 5,333,180 A | 7/1994 | Brown et al. | |
| 5,335,268 A | 8/1994 | Kelly et al. | |

(Continued)

FOREIGN PATENT DOCUMENTS

EP    0426361 B1    3/1995

(Continued)

OTHER PUBLICATIONS

Brandt, A, et al., "Modelling and optimization of call distribution systems", *ITC-15 (International Teletraffic Congress)*, (1997), 133-144.

(Continued)

*Primary Examiner*—Wing Chan
*Assistant Examiner*—Thjuan P. Knowlin
(74) *Attorney, Agent, or Firm*—Welsh & Katz, Ltd.

(57) ABSTRACT

A method includes receiving an inbound call from a caller to a device. A plurality of outbound calls are initiated from the single device based on information received from the inbound call.

44 Claims, 6 Drawing Sheets

U.S. PATENT DOCUMENTS

| | | | |
|---|---|---|---|
| 5,357,564 A | | 10/1994 | Gupta et al. |
| 5,467,391 A | | 11/1995 | Donaghue, Jr. et al. |
| 5,502,761 A | | 3/1996 | Duncan et al. |
| 5,506,890 A | * | 4/1996 | Gupta et al. ............. 379/88.25 |
| 5,511,112 A | | 4/1996 | Szlam |
| 5,546,452 A | | 8/1996 | Andrews et al. |
| 5,555,179 A | | 9/1996 | Koyama et al. |
| 5,581,602 A | | 12/1996 | Szlam et al. |
| 5,590,188 A | | 12/1996 | Crockett |
| 5,627,884 A | | 5/1997 | Williams et al. |
| 5,638,431 A | | 6/1997 | Everett et al. |
| 5,668,856 A | | 9/1997 | Nishimatsu et al. |
| 5,692,033 A | | 11/1997 | Farris |
| 5,719,932 A | | 2/1998 | Roybal |
| 5,724,404 A | | 3/1998 | Garcia et al. |
| 5,727,129 A | | 3/1998 | Barrett et al. |
| 5,739,919 A | | 4/1998 | Lee et al. |
| 5,765,033 A | | 6/1998 | Miloslavsky |
| 5,796,952 A | | 8/1998 | Davis et al. |
| 5,799,292 A | | 8/1998 | Hekmatpour |
| 5,838,781 A | | 11/1998 | Isaksson |
| 5,848,143 A | | 12/1998 | Andrews et al. |
| 5,867,568 A | | 2/1999 | Ackerman et al. |
| 5,870,769 A | | 2/1999 | Freund |
| 5,875,296 A | | 2/1999 | Shi et al. |
| 5,875,422 A | * | 2/1999 | Eslambolchi et al. .......... 704/3 |
| 5,877,757 A | | 3/1999 | Baldwin et al. |
| 5,890,164 A | | 3/1999 | Nielsen |
| 5,911,134 A | | 6/1999 | Castonguay et al. |
| 5,926,539 A | | 7/1999 | Shtivelman |
| 5,940,614 A | | 8/1999 | Allen et al. |
| 5,946,387 A | | 8/1999 | Miloslavsky |
| 5,951,652 A | | 9/1999 | Ingrassia, Jr. et al. |
| 5,953,332 A | | 9/1999 | Miloslavsky |
| 5,953,405 A | | 9/1999 | Miloslavsky |
| 5,963,635 A | | 10/1999 | Szlam et al. |
| RE36,416 E | | 11/1999 | Szlam et al. |
| 5,991,395 A | | 11/1999 | Miloslavsky |
| 5,995,822 A | * | 11/1999 | Smith et al. ................. 455/406 |
| 6,002,760 A | | 12/1999 | Gisby |
| 6,018,724 A | | 1/2000 | Arent |
| 6,021,428 A | | 2/2000 | Miloslavsky |
| 6,041,116 A | * | 3/2000 | Meyers ....................... 379/244 |
| 6,044,145 A | | 3/2000 | Kelly et al. |
| 6,044,355 A | | 3/2000 | Crockett et al. |
| 6,044,368 A | | 3/2000 | Powers |
| 6,047,261 A | | 4/2000 | Siefert |
| 6,067,357 A | | 5/2000 | Kishinsky et al. |
| 6,108,711 A | | 8/2000 | Beck et al. |
| 6,138,139 A | | 10/2000 | Beck et al. |
| 6,167,395 A | | 12/2000 | Beck et al. |
| 6,170,011 B1 | | 1/2001 | Beck et al. |
| 6,175,563 B1 | | 1/2001 | Miloslavsky |
| 6,175,564 B1 | | 1/2001 | Miloslavsky et al. |
| 6,185,292 B1 | | 2/2001 | Miloslavsky |
| 6,259,786 B1 | | 7/2001 | Gisby |
| 6,263,066 B1 | | 7/2001 | Shtivelman |
| 6,278,978 B1 | | 8/2001 | Andre et al. |
| 6,310,630 B1 | | 10/2001 | Kulkarni et al. |
| 6,345,305 B1 | | 2/2002 | Beck et al. |
| 6,373,836 B1 | | 4/2002 | Deryugin et al. |
| 6,389,007 B1 | | 5/2002 | Shenkman et al. |
| 6,393,015 B1 | | 5/2002 | Shtivelman |
| 6,556,974 B1 | * | 4/2003 | D'Alessandro ............... 705/10 |
| 6,563,921 B1 | | 5/2003 | Williams |
| 6,574,329 B2 | | 6/2003 | Takeuchi et al. |
| 6,577,713 B1 | * | 6/2003 | Peterson et al. ......... 379/88.22 |
| 6,584,191 B1 | | 6/2003 | McPartlan et al. |
| 6,732,156 B2 | | 5/2004 | Miloslavsky |
| 6,868,154 B1 | * | 3/2005 | Stuart et al. ........... 379/265.06 |
| 6,931,112 B1 | | 8/2005 | McFarland et al. |
| 2002/0105957 A1 | | 8/2002 | Bondarenko et al. |

FOREIGN PATENT DOCUMENTS

| | | |
|---|---|---|
| JP | 10173780 | 6/1998 |
| WO | WO-9941895 | 8/1999 |

OTHER PUBLICATIONS

Brandt, A, et al., "On a two-queue priority system with impatience and its application to a call center", *Methodology and Computing in Applied Probability*, 1(2), (Aug. 1999), 191-210.

Brandt, A, et al., "On the M(n)/M(n)/s queue with impatient calls", *Performance Evaluation*, 35, (1999), 1-18.

Mandelbaum, A, et al., "Strong Approximations for Markovian Service Networks", *Queueing Systems*, 30, (1998), 149-201.

"Blue Pumpkin—Forcasting and Scheduling", http://www.bluepumpkin.com/products/wfosuite/director.html, (Aug. 17, 2005), 2 pgs.

"Blue Pumpkin Advisor Enterprise Product Brief", http://www.bluepumpkin.com/products/lit/AdvisorEnterprise_ProductBrief.pdf, (Aug. 17, 2005), 4 pgs.

"Blue Pumpkin Director—Enterprise", http://www.bluepumpkin.com/products/lit/DirectorEnterprise_ProductBrief.pdf, (Aug. 16, 2005), 4 pgs.

"Blue Pumpkin director—essential", (Aug. 16, 2005), 2 pgs.

"Blue Pumpkin planner—product brief", http://www.bluepumpkin.com/products/lit/Planner_ProductBrief.pdf, (Aug. 16, 2005), 2pgs.

"Blue Pumpkin workforce—optimization suite", (Aug. 16, 2005), 6 pgs.

"Merging Performance Optimization with workforce management", *BusinessMap* http://www.destinationcrm.com/articles/default.asp?ArticleID=3996, (Apr. 6, 2004), 3 pgs.

"Productivity & Proficiency Management: Blue Pumpkin Advisor", http://www.blue-pumpkin.com/products/wfosuite/advisorexpress.html, 3 pgs.

"Scheduler", http://www.iex.com/TotalView/scheduling.htm, 2 pgs.

"SS7—Signaling System 7", *Webopedia Definition and Links*, http://webopedia.internet.com/TERMS/SS7.html, (Jul. 12, 2000), 2 pgs.

"Time and Activity Monitoring: Blue Pumpkin Activity Manager", http://www.bluepumpkin.com/products/wfosuite/activitymgr.html, 2 pgs.

"Workforce Management", http://www.bluepumpkin.com/products/workforce_management/, 2 pgs.

"Workschedule 5.1 (description)", http://www.1000apps.com/Download-Software.php?title=II_WorkSchedule&company=Image+Integration, 2 pgs.

Dehaan, Peter, "Workforce Management Software", http://ww.connectionsmagazine.com/articles/4/086.html, 5 pgs.

Gamache, Michel, et al., "The Preferential Bidding System at Air Canada", *Transportation Science*, 32(3) Aug. 1998, 246-255.

Hunter, Robert, "Just Plain Rude", http://www.smartmoney.com/stockcloseup/index.cfm?story=20000714, (Jul. 14, 2000), 5 pgs.

Stockford, Paul, "Research Update—Blue Pumpkin Workforce Optimization Suite Version 4.5: Managing to Exxcellence", *Saddletree Research*, (Apr. 5, 2004), 2 pgs.

* cited by examiner

USER INVOKED DIRECTED OUTDIAL METHOD AND APPARATUS

REFERENCE TO RELATED APPLICATIONS

The present patent application is a Continuation of prior Application Ser. No. 09/652,978, filed Aug. 31, 2000, which in turn claims benefit of U.S. Provisional Application No. 60/210,923 filed Jun. 12, 2000.

FIELD OF INVENTION

The invention is related to telephone conferencing.

BACKGROUND OF THE INVENTION

Systems are available for allowing a first caller to have a telephone conference with two or more parties over a telephone environment. However, all parties participating in the telephone conference are treated the same. Furthermore, all parties participating in the conference dial a common number to connect to a common bridge.

Systems of this nature currently available are inflexible because the script executed for all customers cannot alter its behavior based on customer input. Also, the various instances of the script do not exchange any data, so the results of any one script cannot affect the execution of another instance.

SUMMARY OF THE INVENTION

According to one aspect of the present invention, there is provided a method comprising receiving an inbound call from a caller to a device. A plurality of outbound calls are initiated from the single device based on information received from the inbound call.

Other features of the present invention will be apparent from the accompanying drawings and from the detailed description which follows

BRIEF DESCRIPTION OF THE DRAWINGS

The present invention is illustrated by way of example and not limitation in the figures of the accompanying drawings, in which like references indicate similar elements, and in which.

DETAILED DESCRIPTION

A method and apparatus for making a plurality of outbound calls from a single device is disclosed. The method can detect which called parties respond to the call. Based on information associated with each caller, the device can treat each caller as an individual. For example, the device can play different commercial messages to each called party, based on the personal interests of each called party. Furthermore, the device can collect information from each called party, and execute different computer programs based on the information collected.

Thus, from an inbound application, the apparatus can invoke an outbound application and coordinate and synchronize the two applications. In one embodiment, one inbound call launches multiple parallel outbound calls. For example, a call received at a person's office can launch outbound calls to multiple locations, such as the person's home phone, cellular phone, and another office. Each outbound application is treated separately and can be programmed to operate independently of other outbound applications (e.g., outbound calls). If the initial caller hangs up, the application may allow a person to initiate another call.

Figure 1:
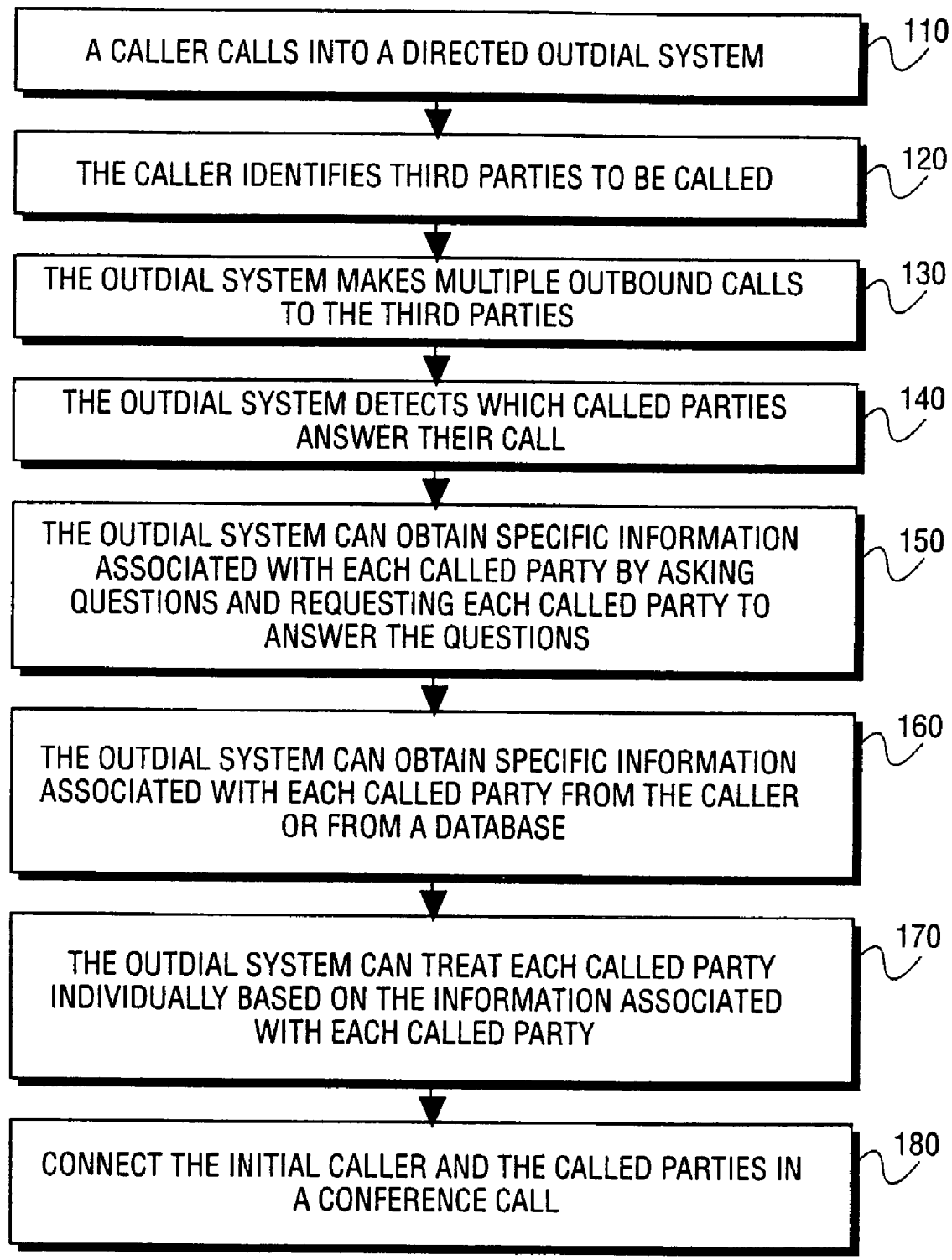
FIG. 1 shows one embodiment for making a plurality of telephone calls from a single device.

FIG. 1 shows one embodiment for making a plurality of telephone calls from a single device. A caller may make an inbound call to a directed outdial system, block 110. The caller may identify a plurality of phone numbers for the system to dial, block 120. In one embodiment, the caller can identify the numbers to the directed outdial system through a voice recognition device, a text to speech device, or a numeric keypad device. The outdial system then makes multiple outbound calls to the third parties, block 130. The outdial system can detect which of the called parties answers the call, block 140. The outdial system may also detect an error, such as a fax machine that answers the call instead of a person, for example. The outdial system can then continue the process with the called parties that answer the call and establish a connection with the outdial system.

The outdial system can treat at least one called party individually based on information associated with that party. The outdial system can obtain information associated with a given called party by asking questions to the called party, for example by accessing a scripted list of questions stored in memory and playing the scripted list of questions to the called party, block 150. The called party is requested to answer the questions. The questions may be answered through a voice recognition device, or a numeric keypad, for example. The outdial system may alternatively obtain specific information associated with each called party from the initial caller, or from a database, block 160.

The outdial system can enable various instances of the script to exchange data, so that any one script can affect the execution of another instance of the script. For example, the system can enable exchanging data between the programs handling the various called parties while the programs are running, to report hang-ups or customer input. Several methods may be used to accomplish this, such as writing to a shared database, shared memory, or shared file.

After obtaining information associated with a given called party, the outdial system can use that information to treat each called party on an individual basis, block 170. For example, the outdial system can send specific messages to a called party based on the information associated with that called party. Different commercial messages may be played to different called parties based on their corresponding personal interests and personal information. The outdial system may also request specific information based on the personal information associated with a given called party.

The outdial system can also connect the called parties that answer the call and the initial caller to a common channel so that all of the parties connected with the outdial system can participate in a conference call, block 180. Furthermore, the flexibility of the system enables the system to connect any combination of answered parties and/or the initial caller in a conference based on input from an individual called party or from the caller.

Figure 2:
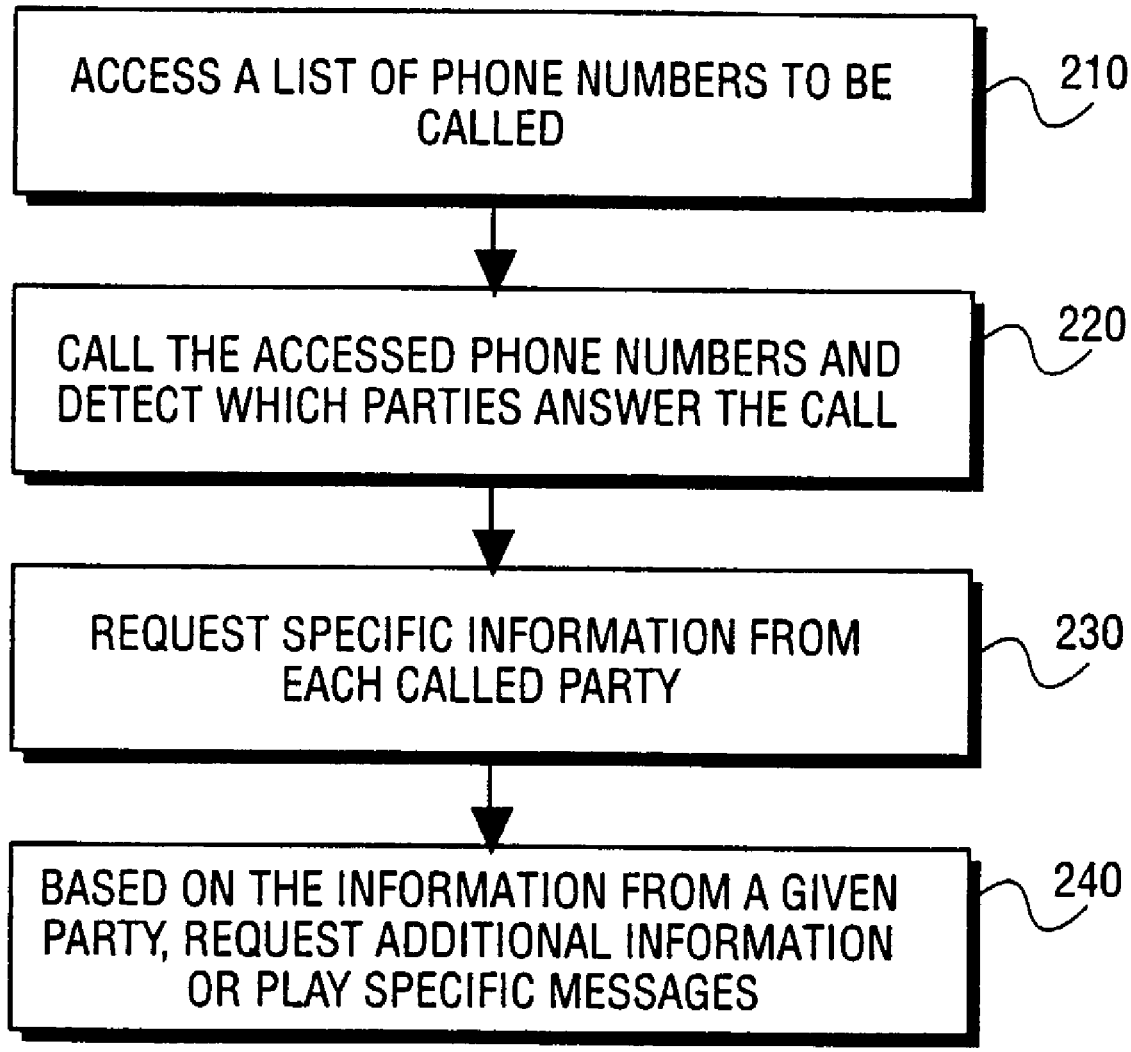
FIG. 2 shows another embodiment of making a plurality of outbound telephone calls from a single device.

FIG. 2 shows another embodiment of making a plurality of outbound telephone calls from a single device. In this embodiment, the outdial system accesses a list of telephone numbers to be called, for example, by reading the list from a database stored in memory, block 210. The outdial system then calls the telephone numbers, and detects which parties answer the call, block 220. The outdial system may then request specific information from each called party block 230, and based on the responses, request additional information or play specific messages, block 240.

For example, if a candidate for public office desires to conduct a survey, the candidate can provide a list of phone numbers of voters within his or her district to the outdial system. The outdial system can then dial those numbers. The voters that answer the phone call are then asked one or more questions. Additional questions may be asked based on the initial answers from the voters. For example, if the candidate is a Democrat, and desires to collect information about Democrats, the first question may be "are you a Democrat?" Those called parties that answer "no" may be played a message that says "thank you for your time." The called parties that answer "yes" may be asked additional follow up questions related to specific issues relevant to the candidate's campaign.

Thus, the outdial system is able to obtain specific information associated with each called party and to treat each called party on an individual basis, even without an initial caller to initiate the process.

Figure 3:
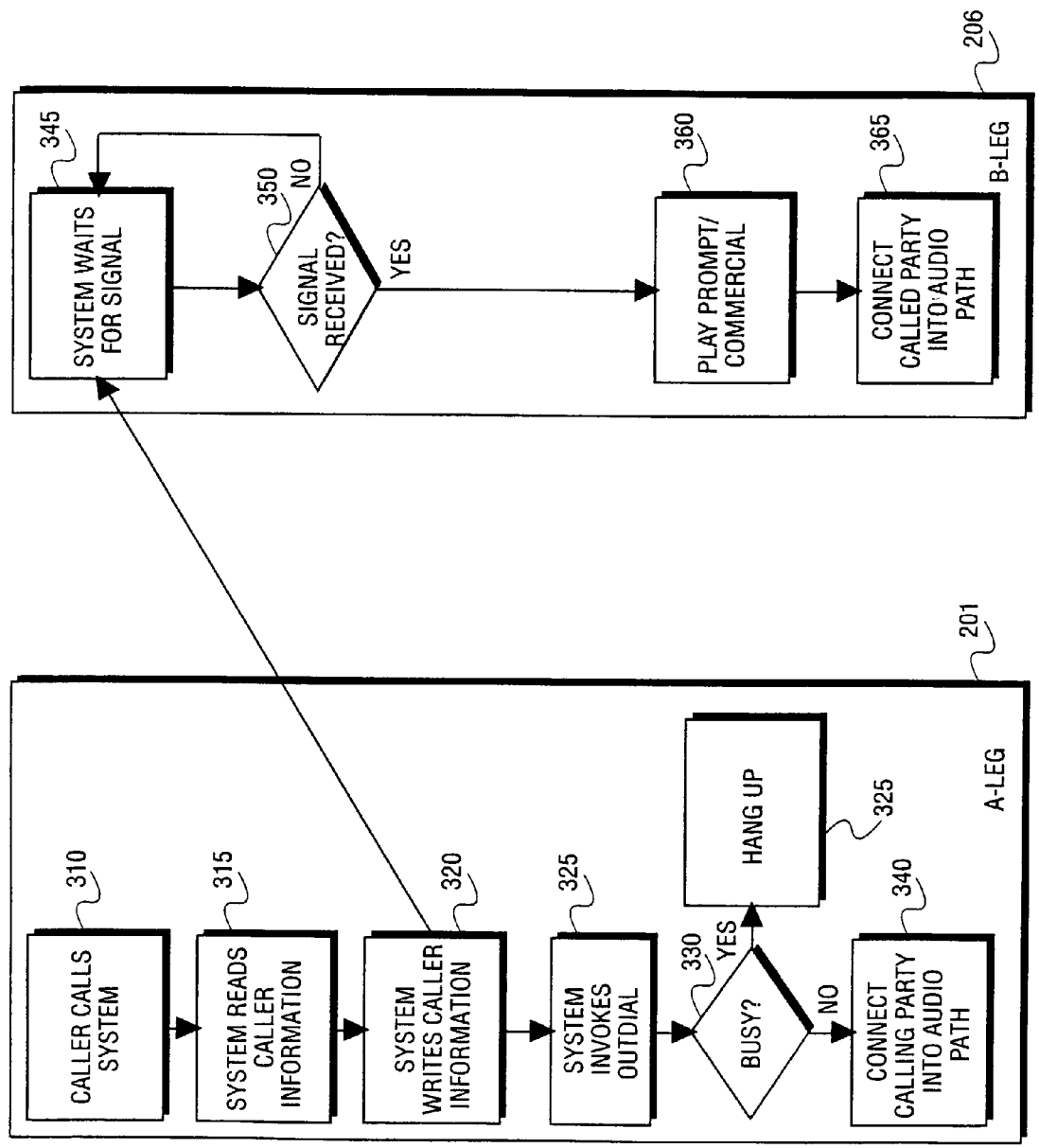
FIG. 3 shows an example of an embodiment of a method used by the outdial system to perform the method of FIG. 1.

FIG. 3 shows an example of an embodiment of a method used by the outdial system to perform the method of FIG. 1. An "A-leg," or inbound, calling program is executed by the system when a caller calls into the system, block 310. The outdial system reads information associated with the caller, block 315, and writes the information into a buffer, block 320. The system then invokes one or more outdial functions, block 325. The outdial function dials the numbers of the parties to be called. If a called number is busy, block 330, the system hangs up, block 335. Otherwise, the system invokes one or more "B-leg," or outbound, calling function for each called party and waits for an answer signal block 345, from each called party to indicate that each party has answered the call. The system then connects with a given called party after an answer signal is received, block 350. The system then may play a message, such as a commercial for example, to each called party, block 360. The message for a given called party may be unique to that party based on information associated with that party. The outdial system may connect the initial caller with the called parties on a single conference path so that the parties may participate in a conference call, block 365.

Figure 4:
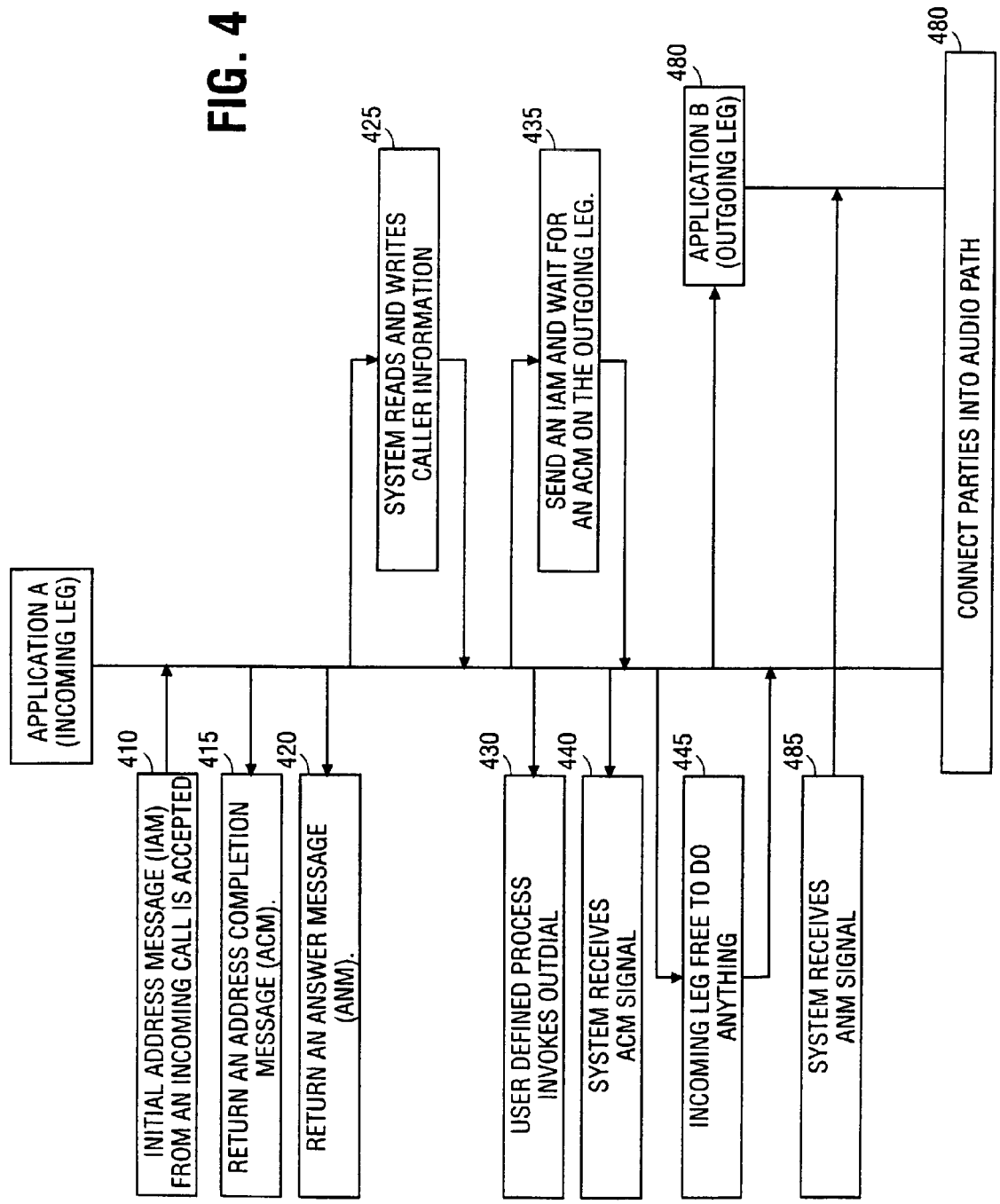
FIG. 4 shows an example embodiment of the signaling used to achieve a successful inbound call to outbound call.

An example embodiment of the signaling used to achieve a successful inbound call to outbound call, or A-leg to B-leg, call is shown in FIG. 4. An initial address message, (IAM), from an incoming call is accepted by the A-leg application program, block 410. Then, an address completion message (ACM) is returned block 415, followed by the answer message (ANM) signal, block 420. The system then prepares caller information, such as ISUP (integrated services user part) parameters to be used by the B-leg application program, block 425. An outdial function is then invoked block 430, which sends an IAM, such as multiple telephone numbers, for example, across a telephone network, block 435. Then, an ACM is returned, block 440. The B-leg application program then controls the outdial process block 480, and waits for an ANM answer message from each called party, block 485. After one or more ANM signals have been returned, the A-leg and the B-leg may be bridged using a conference path so that all connected parties can participate in a conference call, block 490.

Figure 5:
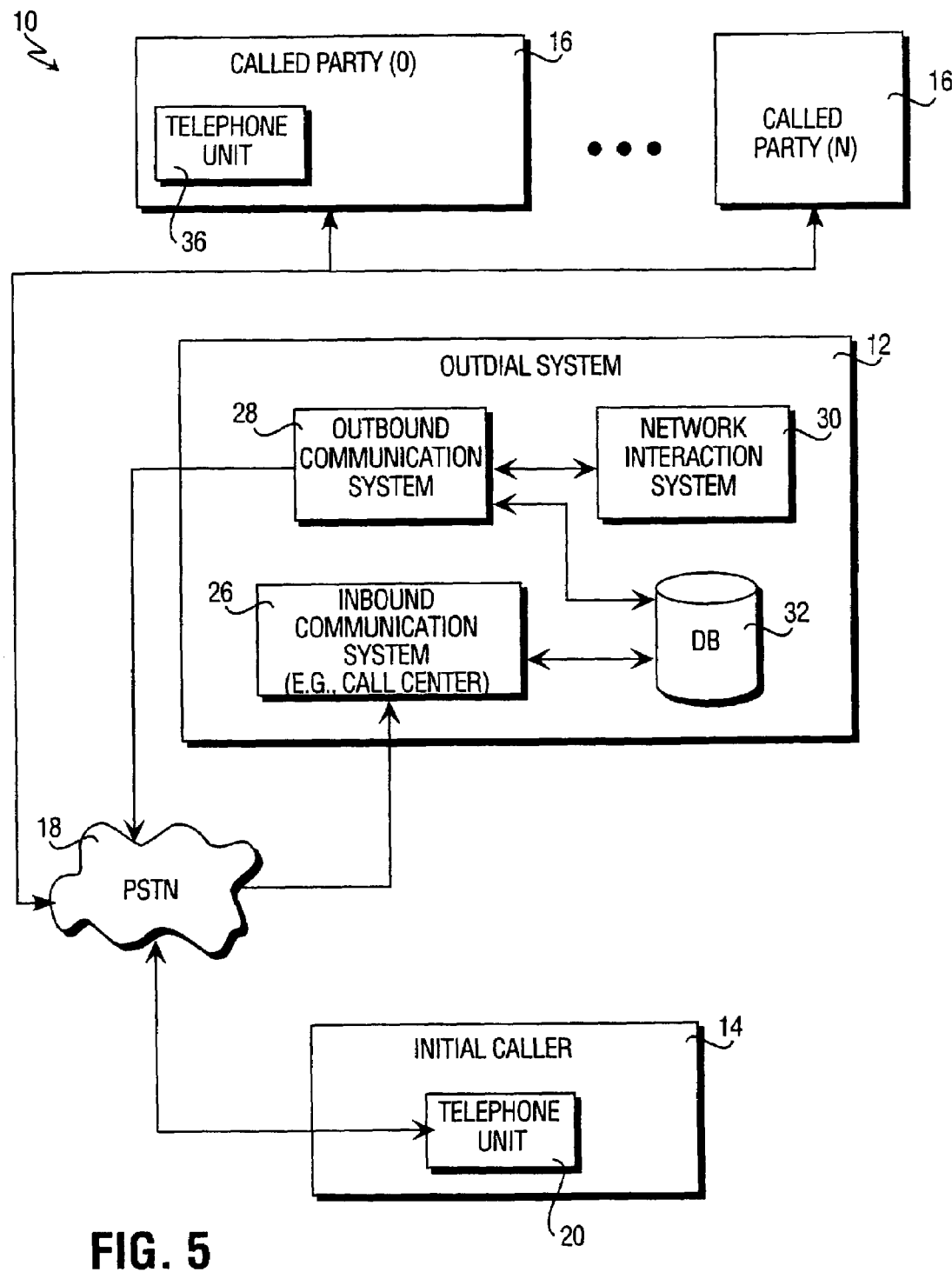
FIG. 5 is a block diagram illustrating an exemplary interaction environment.

FIG. 5 is a block diagram illustrating an exemplary interaction environment 10, facilitated by an outdial system 12. The outdial system 12 may be any system that is capable of receiving, transmitting, queuing, routing, or otherwise processing a telephone call.

The interaction environment 10 is further shown to include an initial caller 14 (e.g., a human or automated entity) that is coupled to the outdial system 12. The interaction environment 10 further includes one or more called parties 16 (e.g., human agents or automated entities), that are capable of answering outbound calls and responding to requests communicated by the initial caller 14, or directed to provide information to the initial caller 14. Each of the called parties 16 is furthermore coupled to the interaction system 12 that serves to facilitate, broker and otherwise control interactions between the initial caller 14 and called parties 16.

The initial caller 14 is shown to be coupled to the customer interaction system 12 by a network, namely a Public Switched Telephone Network (PSTN) 18 via which the initial caller may engage in, for example, telephone-based communications. To this end, the initial caller 14 is shown to have access to telephone equipment 20.

The outdial system 12 is shown to include a number of sub-systems, namely an inbound communication system 26, and an outbound communication system 28. The inbound communication system 26 operates to receive inbound calls received at the interaction system 12 via the PSTN 18. The inbound communication system 26 may include, for example, Automatic Call Distributor (ACD), call center, PBX, or other telephone call processing device. The outbound communication system 28 (e.g., an outbound dialer system) operates to initiate communications with third parties 16 via the PSTN 18. For example, the outbound communication system 28 may perform an outbound telephone call campaign that includes automatically dialing a predetermined list of telephone numbers, detecting a customer pick up and, responsive to the customer pick up, communicating 16.

Each of the inbound communication system 26, and the outbound communication system 28 are shown to be coupled, and have access to, a database 32 that stores information concerning the various called parties 16 and initial caller 14.

Figure 6:
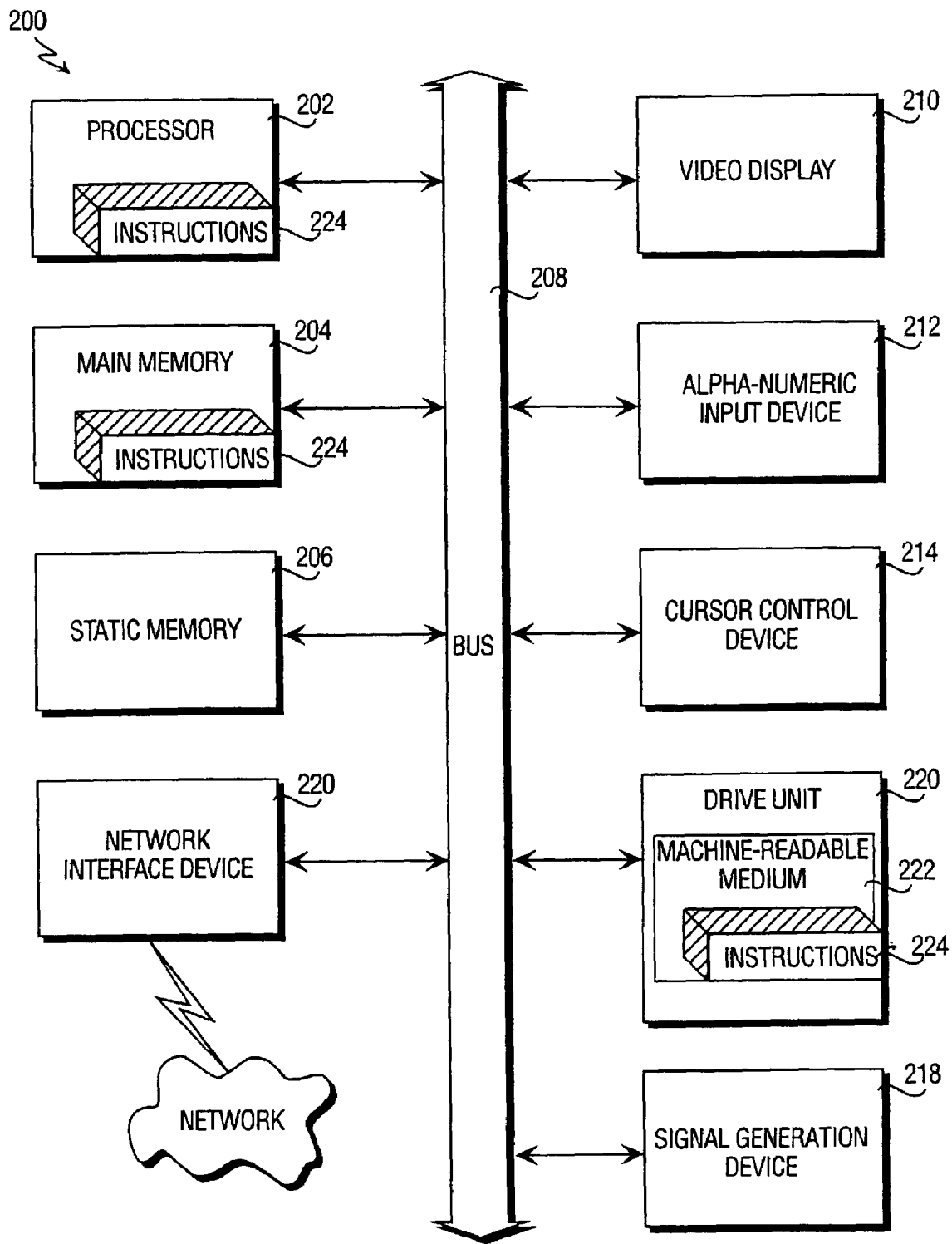
FIG. 6 shows a diagrammatic representation of a computer.

FIG. 6 shows a diagrammatic representation of a machine in the exemplary form of a computer system 600 within which a set of instructions, for causing the machine to perform any one of the methodologies discussed above, may be executed. In alternative embodiments, the machine may comprise a network router, a network switch, a network bridge, Personal Digital Assistant (PDA), a cellular telephone, a web appliance or any machine capable of executing a sequence of instructions that specify actions to be taken by that machine.

The computer system 600 includes a processor 602, a main memory 204 and a static memory 606, which communicate with each other via a bus 608. The computer system 600 may further include a video display unit 610 (e.g., a liquid crystal display (LCD) or a cathode ray tube (CRT)). The computer system 600 also includes an alphanumeric input device 612 (e.g. a keyboard), a cursor control device 614 (e.g. a mouse), a disk drive unit 616, a signal generation device 618 (e.g. a speaker) and a network interface device 620.

The disk drive unit 616 includes a machine-readable medium 622 on which is stored a set instructions (i.e., software) 624 embodying any one, or all, of the methodologies described above. The software 624 is also shown to reside, completely or at least partially, within the main memory 604 and/or within the processor 602. The software 624 may further be transmitted or received via the network interface device 620. For the purposes of this specification, the term "machine-readable medium" shall be taken to include any medium which is capable of storing or encoding a sequence of instructions for execution by the machine and that causes the machine to perform any one of the methodologies of the present invention. The term "machine-readable medium" shall accordingly be taken to include, but not limited to, solid-state memories, optical and magnetic disks, and carrier wave signals.

Thus, a method and system for user involved directed outdial have been described. The user involved directed outdial provides a user with the ability to invoke an outbound application with information provided by an inbound application, as well as the ability to easily transfer ISUP parameters form the inbound call to the outbound call. In addition, directed outdial error reporting in an SS7 telephone network environment is provided. This allows services such as free phone or phone relay, while preserving the initial caller's identification information (e.g., "caller ID information").

Although the present invention has been described with reference to specify exemplary embodiments, it will evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
   receiving an inbound call from a caller to a device;
   initiating a plurality of outbound calls from the device based on information received from the inbound call; and
   connecting a first called party of a first outbound call of the plurality of outbound calls to a second called party of a second outbound call of the plurality of outbound calls or to the caller based upon information that is received from the first called party.

2. The method of claim 1, including detecting each of a plurality of called parties that answers a respective call of the plurality of outbound calls.

3. The method of claim 2, wherein each of the plurality of outbound calls is initiated in parallel and operates independently from each of the other outbound calls.

4. The method of claim 3, wherein the plurality of outbound calls are directed to the plurality of called parties.

5. The method of claim 1, including detecting when an error has occurred with respect to a first outbound call to a first called party.

6. The method of claim 5, including terminating the first outbound call for which the error has occurred.

7. The method of claim 2, including broadcasting a message from the caller to each called party that answers the outbound call.

8. The method of claim 2, including sending individual messages from the caller to each called party of the plurality of called parties that answers the outbound call.

9. The method of claim 1, including allowing the caller to initiate another call upon termination of the inbound call.

10. The method of claim 1, including accessing dialing information from memory to initiate the plurality of outbound calls.

11. The method of claim 2, wherein the plurality of outbound calls are made to a plurality of called parties, respectively.

12. The method of claim 11, wherein initiating the plurality of outbound calls includes initiating a conference call.

13. The method of claim 12, including initiating the conference call utilizing an interactive voice response system to elicit input from the caller.

14. The method of claim 12, including initiating the conference call utilizing numeric input from the caller.

15. The method of claim 2, wherein initiating the plurality of outbound calls includes initiating the plurality of outbound calls to a single party at multiple locations.

16. A method comprising:
    initiating a plurality of parallel and independent outbound calls from a device;
    detecting which called parties answer the plurality of parallel and independent outbound calls; and
    connecting a first called party of a first outbound call of the plurality of parallel and independent outbound calls to a second called party of a second outbound call of the plurality of parallel and independent outbound calls or to the caller based upon information that is received from the first called party.

17. The method of claim 16, wherein detecting which called parties answer the plurality of parallel and independent outbound calls includes detecting when an error has occurred with respect to a first outbound call and terminating the first outbound call for which the error has occurred.

18. The method of claim 16, including prompting each called party that answers one of the plurality of parallel and independent outbound calls to provide input to the device.

19. The method of claim 18, including utilizing an interactive voice response system to prompt each called party that answers to provide the input to the device.

20. The method of claim 18, including promptly each called party that answers to provide numeric input to the device.

21. The method of claim 16, including accessing dialing information from memory to initiate the plurality of outbound calls.

22. A device comprising:
    an inbound communication system that receives an inbound call from a caller to a single device; and
    an outbound communication system that initiates a plurality of outbound calls from the single device based on information received from the inbound call and that connects a first called party of a first outbound call of the plurality of outbound calls to a second called party of a second outbound call of the plurality of outbound calls or to the caller based upon information that is received from the first called party.

23. The device of claim 22, wherein the device detects each of a plurality of called parties that answers a respective call of the plurality of outbound calls.

24. The device of claim 23, wherein each of the plurality of outbound calls is parallel and operates independently from each of the other outbound calls.

25. The device of claim 24, wherein the plurality of outbound calls are directed to a plurality of called parties.

26. The device of claim 22, wherein the device detects when an error has occurred with respect to a first outbound call to a first called party.

27. The device of claim 26, wherein the first outbound call for which the error has occurred is terminated.

28. The device of claim 23, wherein a message from the caller is broadcast to each called party that answers the outbound call.

29. The device of claim 22, wherein the caller is allowed to initiate another call upon termination of the plurality of outbound calls.

30. The device of claim 22, wherein dialing information is accessed from memory to initiate the plurality of outbound calls.

31. The device of claim 23, wherein the plurality of outbound calls are made to the plurality of called parties, respectively.

32. The device of claim 22, wherein initiating the plurality of outbound calls comprises initiating a conference call.

33. The device of claim 32, wherein the conference call is initiated utilizing an interactive voice response system to elicit input from the caller.

34. The device of claim 32, wherein the conference call is initiated utilizing numeric input from the caller.

35. The device of claim 22, wherein initiating the plurality of outbound calls includes initiating the plurality of outbound calls to a single party at multiple locations.

36. A device comprising:
   an outbound communication system that initiates a plurality of parallel and independent outbound calls from a device, and detects which called parties answer the plurality of parallel and independent outbound calls, and wherein the outbound communication system connects a first called party of a first outbound call of the plurality of parallel and independent outbound calls to a second called party of a second outbound call of the plurality of parallel and independent outbound calls or to the caller based upon information that is received from the first called party.

37. The device of claim 36, wherein the device further detects when an error has occurred with respect to a first outbound call and terminates the first outbound call for which the error has occurred.

38. The device of claim 36, wherein each called party that answers the plurality of parallel and independent outbound calls is prompted to provide input to the device.

39. The device of claim 38, wherein an interactive voice response system is utilized to prompt each called party that answers to provide numeric input to the device.

40. The device of claim 36, wherein dialing information is accessed from memory to initiate the plurality of outbound calls.

41. A computer system comprising:
   means for receiving an inbound call from a caller to a device; and
   means for initiating a plurality of outbound calls from the device based on information received from the inbound call; and
   means for connecting a first called party of a first outbound call of the plurality of outbound calls to a second called party of a second outbound call of the plurality of outbound calls or to the caller based upon information that is received from the first called party.

42. A computer system comprising:
   means for initiating a plurality of parallel and independent outbound calls from a device;
   means for detecting which called parties answer the plurality of parallel and independent outbound calls; and
   means for connecting a first called party of a first outbound call of the plurality of parallel and independent outbound calls to a second called party of a second outbound call of the plurality of parallel and independent outbound calls or to the caller based upon information that is received from the first called party.

43. A device comprising:
   means for receiving an inbound call from a caller to a device;
   means for initiating a plurality of outbound calls from the device based on information received from the inbound call; and
   means for connecting a first called party of a first outbound call of the plurality of outbound calls to a second called party of a second outbound call of the plurality of outbound calls or to the caller based upon information that is received from the first called party.

44. A device comprising:
   means for initiating a plurality of parallel and independent outbound calls from a device;
   means for detecting which called parties answer the plurality of parallel and independent outbound calls; and
   means for connecting a first called party of a first outbound call of the plurality of parallel and independent outbound calls to a second called party of a second outbound call of the plurality of parallel and independent outbound calls or to the caller based upon information that is received from the first called party.

* * * * *